United States Patent
Ishida

(10) Patent No.: US 10,134,519 B2
(45) Date of Patent: Nov. 20, 2018

(54) COIL COMPONENT

(71) Applicant: MURATA MANUFACTURING CO., LTD., Kyoto-fu (JP)

(72) Inventor: Yuya Ishida, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 15/452,051

(22) Filed: Mar. 7, 2017

(65) Prior Publication Data

US 2017/0294260 A1    Oct. 12, 2017

(30) Foreign Application Priority Data

Apr. 6, 2016    (JP) .................. 2016-076744

(51) Int. Cl.
| | |
|---|---|
| *H01F 27/29* | (2006.01) |
| *B32B 9/00* | (2006.01) |
| *H01F 27/255* | (2006.01) |
| *B22F 1/00* | (2006.01) |
| *C03C 3/00* | (2006.01) |

(Continued)

(52) U.S. Cl.
CPC .......... *H01F 27/255* (2013.01); *B22F 1/0062* (2013.01); *B22F 1/02* (2013.01); *C03C 3/00* (2013.01); *C08K 3/34* (2013.01); *C08K 9/10* (2013.01); *C22C 38/002* (2013.01); *C22C 38/02* (2013.01); *C22C 38/18* (2013.01); *C22C 38/26* (2013.01); *H01F 1/147* (2013.01); *H01F 17/045* (2013.01); *H01F 27/29* (2013.01); *H01F 27/292* (2013.01); *B22F 1/0014* (2013.01); *B22F 2301/35* (2013.01); *B22F 2302/45* (2013.01); *B22F 2304/10* (2013.01); *C08K 2201/01* (2013.01); *C22C 2202/02* (2013.01); *H01F 2017/048* (2013.01)

(58) Field of Classification Search
CPC .... H01F 1/33; H01F 41/0246; H01F 1/14766; H01F 27/55; H01F 1/12; B22F 1/0059; B22F 2301/35; B22F 2304/10; B22F 1/0003
USPC .................... 336/192, 233; 428/842.2–842.6
See application file for complete search history.

(56) References Cited

U.S. PATENT DOCUMENTS

| | | | |
|---|---|---|---|
| 6,784,782 B2 * | 8/2004 | Inoue ........................ | H01F 1/24 336/200 |
| 8,362,866 B2 * | 1/2013 | Matsuura .................. | B22F 1/02 336/200 |

(Continued)

FOREIGN PATENT DOCUMENTS

| | | |
|---|---|---|
| CN | 102917818 A | 2/2013 |
| CN | 102956341 A | 3/2013 |
| JP | 2003-217919 A | 7/2003 |

OTHER PUBLICATIONS

An Office Action issued by Chinese Patent Office dated Jun. 14, 2018, which corresponds to Chinese Patent Application No. 201710073252.0 and is related to U.S. Appl. No. 15/452,051.

*Primary Examiner* — Alexander Talpalatski
*Assistant Examiner* — Joselito Baisa
(74) *Attorney, Agent, or Firm* — Studebaker & Brackett PC

(57) ABSTRACT

A coil component including: a magnetic core that contains an Fe-based magnetic powder and a binding agent, the Fe-based magnetic powder having an insulator film and having a volume resistivity of $10^7$ Ω·cm or more; and a coil conductor. The average particle size D50 of the Fe-based magnetic powder is 5 μm or smaller and the magnetic permeability of the magnetic core is 5 or more.

8 Claims, 1 Drawing Sheet

(51) Int. Cl.
*C08K 3/34* (2006.01)
*C08K 9/10* (2006.01)
*C22C 38/00* (2006.01)
*C22C 38/02* (2006.01)
*C22C 38/18* (2006.01)
*C22C 38/26* (2006.01)
*H01F 1/147* (2006.01)
*B22F 1/02* (2006.01)
*H01F 17/04* (2006.01)

(56) References Cited

U.S. PATENT DOCUMENTS

| | | | | |
|---|---|---|---|---|
| 8,629,748 B2* | 1/2014 | Nakada | ............... | H01F 27/00 |
| | | | | 148/100 |
| 8,749,339 B2* | 6/2014 | Ogawa | ............... | H01F 41/098 |
| | | | | 336/233 |
| 2004/0245883 A1* | 12/2004 | Mitcham | ............... | H02K 1/02 |
| | | | | 310/261.1 |
| 2005/0068150 A1* | 3/2005 | Matsutani | ............... | H01F 17/04 |
| | | | | 336/223 |
| 2008/0003126 A1* | 1/2008 | Watanabe | ............... | B22F 1/02 |
| | | | | 419/35 |
| 2008/0029300 A1* | 2/2008 | Harada | ............... | B22F 1/02 |
| | | | | 174/391 |
| 2008/0152897 A1* | 6/2008 | Maeda | ............... | B22F 1/0059 |
| | | | | 428/323 |
| 2008/0248245 A1* | 10/2008 | Maeda | ............... | B22F 1/02 |
| | | | | 428/144 |
| 2009/0174512 A1* | 7/2009 | Watanabe | ............... | B22F 1/02 |
| | | | | 335/296 |
| 2013/0200970 A1* | 8/2013 | Ogawa | ............... | H01F 41/098 |
| | | | | 336/83 |

* cited by examiner

COIL COMPONENT

CROSS REFERENCE TO RELATED APPLICATIONS

This application claims benefit of priority to Japanese Patent Application 2016-076744 filed Apr. 6, 2016, the entire content of which is incorporated herein by reference.

TECHNICAL FIELD

The present disclosure relates to a coil component.

BACKGROUND

Magnetic cores of coil components for use in the high frequency range have been required to have a high magnetic permeability and low-loss characteristics in the high frequency range. One example of such magnetic cores is a dust core obtained by compression molding of magnetic metal powder (for example, such a core is disclosed in Japanese Unexamined Patent Application Publication No. 2003-217919).

With the increasing use of Near Field Communication (NFC) and wireless power transmission in recent years, there have been an increasing number of circuits that use larger AC currents than before. Among such wireless power transmission circuits, a magnetic resonance circuit is able to feed power to a plurality of devices and thus is being considered for use for mobile terminals such as smartphones. Since the magnetic resonance circuit is designed to operate at a resonant frequency of about 6.78 MHz, for the circuit to output high power at that frequency, a coil component is needed whose Q factor does not decrease much even when a large amplitude current is passed.

SUMMARY

Although the magnetic resonance circuit has the same configuration as the NFC circuit, the magnetic resonance circuit uses a current with a larger amplitude than the NFC circuit. The NFC circuit uses a current of about 300 mArms, whereas the magnetic resonance circuit uses a current of about 1 Arms or larger. This may cause a problem in that, if the effective AC resistance (Rac) is large when such a large current is passed, heating of a device may occur.

Accordingly, it is an object of the present disclosure to provide a coil component that keeps the Rac low even when a large amplitude current of, for example, about 1 Arms or larger is passed.

A coil component of one embodiment of the present disclosure includes: a magnetic core that contains an Fe-based magnetic powder and a binding agent and that has a magnetic permeability of 5 or more, the Fe-based magnetic powder having a volume resistivity of $1.0 \times 10^7$ Ω·cm or more; and a coil conductor. The Fe-based magnetic powder has an average particle size, defined as D50, of 5 µm or smaller.

According to this embodiment of the present disclosure, it is possible to keep the Rac low even when a large amplitude current is passed.

It is preferable that the coil component be arranged such that the D50 of the Fe-based magnetic powder is 2 µm or smaller. According to this aspect of the present disclosure, it is possible to further reduce the rate of increase in Rac while keeping the Q factor high.

It is preferable that the coil component be arranged such that the volume resistivity of the Fe-based magnetic powder is $10^{10}$ Ω·cm or more. According to this aspect of the present disclosure, it is possible to keep the Q factor high and reduce the initial Rac as well as further reducing the rate of increase in Rac. It should be noted that, in this description, the term "initial Rac" denotes the Rac when a current of about 0.1 Arms is passed.

It is preferable that the coil component further include a terminal electrode that is disposed on the magnetic core and that is in electrical communication with the coil conductor. The coil component is preferably arranged such that: the binding agent contains a cyclic siloxane or a branched siloxane; and the terminal electrode contains one selected from the group consisting of Sc, Ti, V, Cr, Mn, Y, Zr, Nb, Mo, Tc, Hf, Ta, W, and Re. According to this aspect of the present disclosure, it is possible to improve the adhesion between the terminal electrode and the magnetic core.

It is preferable that the coil component be arranged such that the Fe-based magnetic powder has an insulator film which contains an inorganic oxide and a water-soluble polymer. According to this aspect of the present disclosure, it is possible to prevent or reduce the occurrence of cracks in the insulator film when the magnetic core is formed and thus possible to prevent or reduce the occurrence of eddy current loss which is caused by a decrease in resistance of the magnetic core. This makes it possible to keep the Q factor high and reduce the initial Rac as well as further reducing the rate of increase in Rac of the coil component.

It is preferable that the coil component be arranged such that the Fe-based magnetic powder has an insulator film which contains phosphate glass. According to this aspect of the present disclosure, it is possible to keep the Q factor high and reduce the initial Rac as well as further reducing the rate of increase in Rac.

Other features, elements, characteristics and advantages of the present disclosure will become more apparent from the following detailed description with reference to the attached drawings.

DETAILED DESCRIPTION

Figure 1:
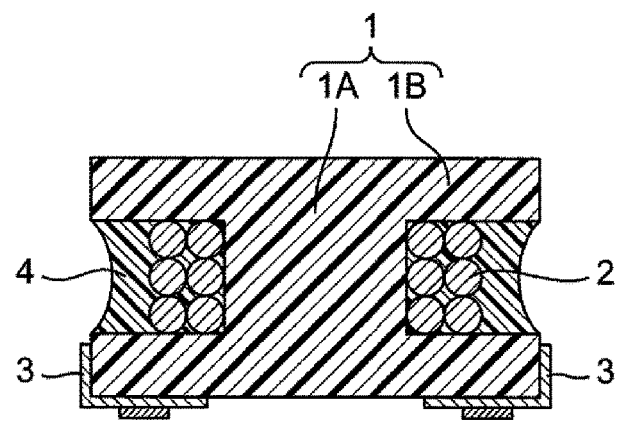
FIG. 1 is a cross-sectional view schematically illustrating one example of a coil component of an embodiment of the present disclosure.

The following specifically describes an embodiment of the present disclosure with reference to the drawings.

A coil component of the present disclosure includes: a magnetic core that contains an Fe-based magnetic powder and a binding agent and that has a magnetic permeability of about 5 or more, the Fe-based magnetic powder having a volume resistivity of about $1.0 \times 10^7$ Ω·cm or more; and a coil conductor. The Fe-based magnetic powder has an average particle size D50 of about 5 µm or smaller.

The coil component of the present disclosure is an electronic component that is constituted by a molded body and outer electrodes disposed on the surface of the molded body. Examples of the electronic component include coil components such as wire-wound coil components including a molded magnetic core and multilayer coil components including molded magnetic sheets.

The magnetic core is not limited to a particular kind, provided that the magnetic core is a molded body that contains an Fe-based magnetic powder and a binding agent. An example of the magnetic core is a core that is obtained by: adding a binding agent to an Fe-based magnetic powder; molding the mixture into a predetermined shape with the use of a mold or by injecting the mixture into a mold; and curing the mixture by heat if needed.

Examples of the Fe-based magnetic powder for use for the magnetic core include Fe powders (pure iron powders) and known Fe-based magnetic powders which are powders of Fe-based alloys such as FeNi, FeCo, FeSi, FeSiCr, FeSiAl, FeSiBCr, and FePCSiBNbC. These powders may be used individually or two or more of them may be used in combination. The pure iron powder may be, for example, carbonyl iron powder obtained by pyrolyzing pentacarbonyl.

The average particle size, which is represented by the median diameter D50 in the cumulative particle size distribution, of the Fe-based magnetic powder is about 5 μm or smaller. The use of an Fe-based magnetic powder having a D50 of about 5 μm or smaller makes it possible to reduce the rate of increase in Rac and reduce the rate of decrease in Q factor when a large amplitude current is passed. The D50 of the Fe-based magnetic powder is preferably about 2 μm or smaller. The use of an Fe-based magnetic powder having a D50 of about 2 μm or smaller makes it possible to further reduce the rate of increase in Rac when a large amplitude current is passed. Furthermore, the use of an Fe-based magnetic powder having a D50 of about 1.5 μm or smaller makes it possible to further reduce the rate of increase in Rac while reducing the rate of decrease in Q factor when a large amplitude current is passed. The D50 of the Fe-based magnetic powder may be, for example, about 0.1 μm or larger, and is preferably about 1 μm or larger. The use of an Fe-based magnetic powder having a D50 of about 1 μm or larger makes it possible to reduce initial Rac.

The D50 may be determined by any method, provided that the method can determine the cumulative particle size distribution of the powder. An example is a laser diffraction scattering method. Alternatively, the D50 may be determined by analyzing an image of a cross section of the magnetic core with the use of a scanning electron microscope.

The magnetic permeability of the magnetic core is about 5 or more. The initial Rac when a large amplitude current is applied depends on the Rdc of the coil conductor. For a fixed L factor, an increase in magnetic permeability leads to a decrease in the number of turns of the coil. Therefore, the magnetic permeability that is as large as about 5 or more enables a reduction in the number of turns of the coil and thus a reduction in the initial Rac.

Furthermore, the Fe-based magnetic powder has an insulator film that covers the surfaces of particles of the powder, and the volume resistivity of the powder is about $10^7$ Ω·cm or more, preferably about $10^{10}$ Ω·cm or more. The use of an Fe-based magnetic powder having a volume resistivity of about $10^7$ Ω·cm or more makes it possible to further reduce eddy current loss and possible to reduce the rate of increase in Rac when a large amplitude current is applied. The volume resistivity of the powder may be measured with the use of, for example, a powder resistivity measurement system MCP-PD51 available from Mitsubishi Chemical Analytech Co., Ltd. The insulator film may be a film that contains an inorganic oxide and/or an organic resin, preferably a film that contains an inorganic oxide and an organic resin. The inorganic oxide is preferably at least one selected from the group consisting of $TiO_2$, $SiO_2$, $Al_2O_3$, and ZrO in view of the strength and the specific resistance of the oxide. The organic resin is not limited to a particular kind, and may be an epoxy resin, a silicone resin, or the like. The insulator film preferably contains a water-soluble polymer. The water-soluble polymer may be, for example, at least one selected from the group consisting of polyvinylpyrrolidone, polyethyleneimine, carboxymethylcellulose, gelatin, polyacrylic acid, polyethylene glycol, and polyvinyl alcohol. The water-soluble polymer may be preferably polyvinylpyrrolidone. The insulator film preferably contains an inorganic oxide and a water-soluble polymer. When the insulator film contains a water-soluble polymer, it is possible to prevent or reduce the occurrence of cracks in the insulator film during molding of the magnetic core. This makes it possible to maintain the volume resistivity of the Fe-based magnetic powder even after the powder is formed into the magnetic core and possible to prevent or reduce the occurrence of eddy current loss, and possible to reduce the rate of increase in Rac and reduce the rate of decrease in Q factor when a large amplitude current is applied.

The insulator film that contains an inorganic oxide and a water-soluble polymer may be formed by, for example, the following method. An Fe-based magnetic powder is dispersed in a solvent composed of a hydrophilic alcohol such as methanol or ethanol. Next, a metal alkoxide and a water-soluble polymer are added to the dispersion and stirred. During this process, the metal alkoxide is hydrolyzed and the surfaces of the particles of the Fe-based soft magnetic material powder are coated with an insulator that contains a metal oxide (which is a hydrolyzed version of the metal alkoxide) and the water-soluble polymer. Then, the solvent is removed by distillation from the dispersion, and the Fe-based magnetic powder having the insulator film is dried at, for example, about 50 to 300° C. The metal of the metal alkoxide may be Si, Ti, Al, or Zr. Two or more metal alkoxides may be used. The alkoxy group of the metal alkoxide may be methoxy, ethoxy, propoxy, or the like. The amount of the inorganic oxide may be about 0.01 wt % or more and about 5 wt % or less with respect to the soft magnetic material powder, and the amount of the water-soluble polymer may be about 0.01 wt % or more and about 1 wt % or less with respect to the soft magnetic material powder. It should be noted that, for acceleration of the hydrolysis of the metal alkoxide, an acid catalyst such as hydrochloric acid, acetic acid, or phosphoric acid, a basic catalyst such as ammonia, sodium hydroxide, or piperidine, or a salt catalyst such as ammonium carbonate or ammonium acetate may be added according to need.

The binding agent may contain a thermosetting resin such as an epoxy resin, a phenolic resin, or a silicone resin, or a low-melting glass. In the case where the binding agent is a thermosetting resin, the magnetic core may be formed by: mixing the binding agent with the magnetic powder; forming the mixture into a shape with the use of a mold; and curing the mixture by heat. In the case where the binding agent is a low-melting glass, the magnetic core may be formed by: mixing the low-melting glass with the magnetic powder; and sintering the mixture.

The binding agent may further contain a cyclic siloxane resin or a branched siloxane resin. The reason is that, in the case where a terminal electrode is constituted by a film of a metal having a high oxygen affinity (such as Sc, Ti, V, Cr, Mn, Y, Zr, Nb, Mo, Tc, Hf, Ta, W, Re, or the like) or constituted by a film of an alloy containing such a metal, the siloxane resin improves the adhesion between the terminal electrode and the magnetic core (this is described later).

The cyclic siloxane resin has a cyclic siloxane structure. The cyclic siloxane structure is a cyclic structure formed of only Si—O bonds. The number of Si—O bonds in the cyclic siloxane structure is preferably about 3 to 10, more preferably about 3 to 8. The branched siloxane resin has a branched siloxane structure. The branched siloxane structure may be formed of three Si—O—Si bonds, or may be formed of four Si—O—Si bonds. A specific example of a binding agent for use in the present disclosure may be a binding agent formed from a compound represented by the following Formula (1) or (2).

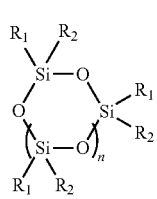
(1)

The cyclic siloxane resin in this description may be formed from a compound which is a cyclic siloxane represented by Formula (1). For example, the cyclic siloxane resin may be formed by polymerization of reactive groups of the compound represented by Formula (1). In Formula (1), n is an integer of 1 or more and 8 or less, preferably an integer of 3 or more and 6 or less. It seems that, when n is within this range, O atoms (oxygen atoms) of the cyclic siloxane structure are likely to be arranged in-plane and make surface contact with the outer electrode that contains a metal having a high oxygen affinity and this improves the adhesion between the magnetic core and the outer electrode. Furthermore, one of $R_1$ and $R_2$ is a reactive group containing amino, vinyl, epoxy, hydroxyl, phenol, acryloyl, methacryloyl, oxetanyl, carboxyl, or mercapto, and the other represents hydrogen, a C1-C6 alkyl group, or a phenyl group. It is preferable that at least one of $R_1$ and $R_2$ be a vinyl group or an epoxy group and the other be a methyl group or a phenyl group. An example of a cyclic siloxane in which at least one of $R_1$ and $R_2$ is a vinyl group is 2,4,6,8-tetramethyl-2,4,6,8-tetravinylcyclotetrasiloxane. Furthermore, in the case where one of $R_1$ and $R_2$ is a reactive group containing epoxy, the reactive group may be an aliphatic epoxy group, an alicyclic epoxy group, or an aromatic epoxy group. Examples of the aliphatic epoxy group include butadiene dioxide, dimethylpentane dioxide, diglycidyl ether, 1,4-butanediol diglycidyl ether, 3-glycidyloxypropyl, diethylene glycol diglycidyl ether, and dipentene dioxide. The alicyclic epoxy group may contain at least one four- to seven-membered cyclic aliphatic ring per molecule and contains at least one epoxy group per molecule. An example of the alicyclic epoxy group is (7-{oxabicyclo[4.1.0]heptyl}) alkyl. Examples of the aromatic epoxy group include bisphenol A epoxy, bisphenol F epoxy, phenol novolac epoxy, cresol-novolac epoxy, biphenol epoxy, biphenyl epoxy, and the like.

The cyclic siloxane represented by Formula (1) may be a compound in which at least one of $R_1$ and $R_2$ is an aliphatic epoxy group and the other is a methyl group or a phenyl group. Examples of such a cyclic siloxane include cyclotrisiloxanes, cyclotetrasiloxanes, and cyclopentasiloxanes which contain 3-glycidyloxypropyl as aliphatic epoxy. The cyclic siloxane is preferably a cyclotetrasloxane that contains 3-glycidyloxypropyl.

Alternatively, the cyclic siloxane represented by Formula (1) may be a compound in which at least one of $R_1$ and $R_2$ is an alicyclic epoxy group and the other is a methyl group or a phenyl group. Examples include cyclotrisiloxanes, cyclotetrasiloxanes, and cyclopentasiloxanes which contain (7-{oxabicyclo[4.1.0]heptyl}) ethyl as alicyclic epoxy. The cyclic siloxane is preferably a cyclotetrasiloxane that contains (7-{oxabicyclo[4.1.0]heptyl}) ethyl. Specific examples of such cyclotetrasiloxanes include: 2,4-di[2-(7-{oxabicyclo[4.1.0]heptyl})ethyl]-2,4,6,6,8,8-hexamethyl-cyclotetrasiloxane, 4,8-di[2-(7-{oxabicyclo[4.1.0]heptyl})ethyl]-2,2,4,6,6,8-hexamethyl-cyclotetrasiloxane, 2,4-di[2-(7-{oxabicyclo[4.1.0]heptyl})ethyl]-6,8-dipropyl-2,4,6,8-tetramethyl-cyclotetrasiloxane, and 4,8-di[2-(7-{oxabicyclo[4.1.0]heptyl})ethyl]-2,6-dipropyl-2,4,6,8-tetramethyl-cyclotetrasiloxane which contain two epoxy groups per molecule; 2,4,8-tri[2-(7-{oxabicyclo[4.1.0]heptyl})ethyl]-2,4,6,6,8-pentamethyl-cyclotetrasiloxane and 2,4,8-tri[2-(7-{oxabicyclo[4.1.0]heptyl})ethyl]-6-propyl-2,4,6,8-tetramethyl-cyclotetrasiloxane which contain three epoxy groups per molecule; and 2,4,6,8-tetra[2-(7-{oxabicyclo[4.1.0]heptyl})ethyl]-2,4,6,8-tetramethyl-cyclotetrasiloxane which contains four epoxy groups per molecule. The cyclic siloxane is preferably 2,4,6,8-tetra[2-(7-{oxabicyclo[4.1.0]heptyl})ethyl]-2,4,6,8-tetramethyl-cyclotetrasiloxane.

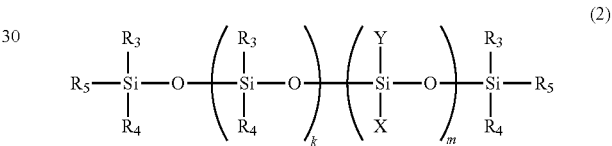
(2)

The branched siloxane resin in this description may be formed from a compound which is a branched siloxane represented by Formula (2). For example, the branched siloxane resin may be formed by polymerization of reactive groups of a compound represented by Formula (2). In Formula (2), k and m each represent an integer with the proviso that they are not simultaneously 0. Furthermore, k is 0 or more and 8 or less, and m is 0 or more and 4 or less. At least one of $R_3$, $R_4$, and $R_5$ is a reactive group containing amino, vinyl, epoxy, hydroxyl, phenol, methacryl, carboxyl, or mercapto, and the other(s) is/are hydrogen, a C1-C6 alkyl group, and/or a phenyl group. At least one of X and Y has a structure represented by the following Formula (3) or (4) and the other represents hydrogen, a C1-C6 alkyl group, or a phenyl group. It is preferable that at least one of $R_3$, $R_4$, and $R_5$ be a vinyl group or an epoxy group and the other(s) is/are a methyl group and/or a phenyl group. In the case where at least one of $R_3$, $R_4$, and $R_5$ is a reactive group containing epoxy, the reactive group may be an aliphatic epoxy group, an alicyclic epoxy group, or an aromatic epoxy group. Examples of the aliphatic epoxy group include butadiene dioxide, dimethylpentane dioxide, diglycidyl ether, 1,4-butanediol diglycidyl ether, 3-glycidyloxypropyl, diethylene glycol diglycidyl ether, dipentene dioxide, and the like. The alicyclic epoxy group may contain at least one four- to seven-membered cyclic aliphatic group per molecule and contains at least one epoxy group per molecule. An example of the alicyclic epoxy group is (7-{oxabicyclo[4.1.0]heptyl}) alkyl. Examples of the aromatic epoxy group include bisphenol A epoxy, bisphenol F epoxy, phenol novolac epoxy, cresol-novolac epoxy, biphenol epoxy, biphenyl epoxy, and the like. It is preferable that $R_3$ and $R_4$ be methyl and $R_5$ be (7-{oxabicyclo[4.1.0]heptyl}) ethyl.

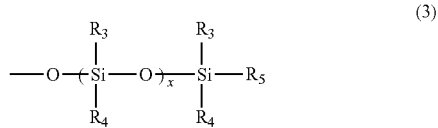

(3)

In Formula (3), x represents 0 or an integer of 1 or more and 8 or less, at least one of $R_3$, $R_4$, and $R_5$ is a reactive group containing amino, vinyl, epoxy, hydroxyl, phenol, acryloyl, methacryloyl, oxetanyl, carboxyl, or mercapto, and the other(s) is/are hydrogen, a C1-C6 alkyl group, and/or a phenyl group. $R_3$, $R_4$, and $R_5$ may be the same groups as defined in Formula (2). It is preferable that $R_3$ and $R_4$ be methyl and $R_5$ be (7-{oxabicyclo[4.1.0]heptyl}) ethyl.

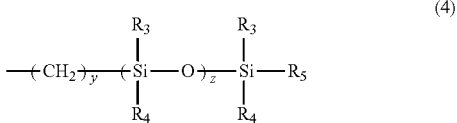

(4)

In Formula (4), y represents an integer of 1 or more and 12 or less, preferably an integer of 2 or more and 8 or less, and z represents an integer of 1 or more and 8 or less, preferably an integer of 2 or more and 6 or less. At least one of $R_3$, $R_4$, and $R_5$ is a reactive group containing amino, vinyl, epoxy, hydroxyl, phenol, acryloyl, methacryloyl, oxetanyl, carboxyl, or mercapto and the other(s) is/are hydrogen, a C1-C6 alkyl group, and/or a phenyl group. $R_3$, $R_4$, and $R_5$ may be the same groups as defined in Formula (2). It is preferable that $R_3$ and $R_4$ be methyl and $R_5$ be (7-{oxabicyclo[4.1.0]heptyl}) ethyl.

A specific example of the branched siloxane represented by Formula (2) is a compound in which k is 0, m is 1, X and Y are represented by Formula (3), $R_3$ and $R_4$ are methyl, and $R_5$ is (7-{oxabicyclo[4.1.0]heptyl}) ethyl. Another example is a compound in which k is 0, m is 1, X is represented by Formula (3), Y, $R_3$, and $R_4$ are methyl, and $R_5$ is (7-{oxabicyclo[4.1.0]heptyl}) ethyl.

The coil conductor is a conductor in the form of a coil. An example of the coil conductor is a conducting wire wound in the form of a coil. The conducting wire may be, for example, a copper wire or a silver wire. Alternatively, the coil conductor may be formed by applying a conductive paste in the shape of a coil on a substrate. Alternatively, the coil conductor may be formed by patterning a metal film on a substrate into the shape of a coil by etching or the like.

The coil conductor is wound around the magnetic core. Alternatively, the coil conductor is provided in the magnetic core. The shape of the magnetic core may either be substantially a drum core or a toroidal shape. Alternatively, the magnetic core may be substantially cuboid. The magnetic core substantially in the shape of a drum core may be obtained by molding a mixture of an Fe-based magnetic powder and a binding agent and forming flange portions and a core portion with the use of a grinding machine or the like. Alternatively, the magnetic core in the shape of a drum core may be formed by molding the mixture into the form of a drum core. A coil component constituted by a magnetic core and a coil conductor provided inside the magnetic core may be formed by: burying the coil conductor in the mixture of the Fe-based magnetic powder and the binding agent; and molding the mixture.

In the case where the coil conductor is a conducting wire (e.g., copper wire) wound in the form of a coil, the conducting wire and terminal electrodes may be made to electrically communicate with each other by: winding the conducting wire around the magnetic core and connecting the conducting wire to the terminal electrodes; and dipping it in solder. Alternatively, the terminal electrodes and the conducting wire may be made to electrically communicate with each other by plating the terminal electrodes and bonding the conducting wire on the plates by heat.

In the present embodiment, the coil component further includes terminal electrodes. Each terminal electrode is a conductor film disposed on the magnetic core and is in contact with and in electrical communication with the coil conductor. The terminal electrode may be a film made of a metal such as Ag, Cu, Ni, Ti, Ni, Cr, Sc, V, Mn, Y, Zr, Nb, Mo, Tc, Hf, Ta, or W or a film of an alloy containing at least one selected from these metals. A terminal electrode made of a metal film of Ag and/or Cu is preferable because such a film is highly conductive. In the case where the terminal electrode is constituted by a film containing a metal that has a high oxygen affinity (selected from the group consisting of Sc, Ti, V, Cr, Mn, Y, Zr, Nb, Mo, Tc, Hf, Ta, W, and Re, preferably Cr, Ti or the like) and the binding agent contains the above-mentioned cyclic siloxane resin or branched siloxane resin, the adhesion between the terminal electrode and the magnetic core is improved. The reason for this seems to be that the use of the cyclic or branched siloxane resin helps the O atoms bound to Si atoms be arranged in-plane and the O atoms arranged in-plane are likely to make close contact with the terminal electrode formed of a metal having a high oxygen affinity. The siloxane resin is preferably a trimer, tetramer, or pentamer.

The terminal electrode may be formed by applying paste such as Ag paste or Cu paste to the magnetic core. Alternatively, the terminal electrode may be formed by Ni sputtering, Ti sputtering, NiCr sputtering, or the like. The terminal electrode may have a single layer or may be a multilayer body which has multiple layers. For example, the terminal electrode may have: a layer obtained by sputtering an alloy having a high oxygen affinity such as Cr or Ti; a Ni plating layer; and a Sn plating layer.

The coil component which includes a magnetic core and a coil conductor provided inside the magnetic core may be formed by: molding the mixture of an Fe-based magnetic powder and a binding agent into a magnetic sheet; and burying the coil conductor in the magnetic sheet. Alternatively, the coil component may be formed by: forming an electrode coil pattern on a magnetic sheet made from the mixture of an Fe-based magnetic powder and a binding agent; stacking these sheets together; cutting the stack of the sheets; curing the cut body by heat; and then forming metal films (outer electrodes) of Cr, V, Ti and/or the like by sputtering. The outer electrodes may be plated with Ni and/or Sn.

A method of producing an electronic component of the present disclosure is described as below for the case where, for example, the electronic component is a wire-wound coil component. FIG. 1 is a cross-sectional view schematically illustrating one example of a structure of a wire-wound coil component. The wire-wound coil component includes: a magnetic core 1 that has a core portion 1A and flange portions 1B positioned at the top and bottom ends of the core portion 1A; a coil conductor 2 wound around the core portion 1A; terminal electrodes 3 which are disposed on the flange portion 1B at the bottom and which are electrically connected to the respective opposite ends of the coil conductor 2; and a covering resin 4 which is provided between the flange portions 1B at the top and bottom and which seals the coil conductor 2. The magnetic core 1 may be obtained by: mixing an Fe-based magnetic powder and a binding agent; molding the mixture into the shape of a core; and then curing the binding agent by heat. The terminal electrodes 3 are conductive films. The terminal electrodes 3 may be metal films made from a transition metal such as Cr, V, and/or Ti. The metal films may be formed by sputtering. Provided that the surface of each terminal electrode 3 which makes contact with the magnetic core is constituted by a metal film made of the above-mentioned transition metal, the other surfaces of the terminal electrode 3 may be constituted by a film of a metal other than the above-mentioned metals.

Figure 2:
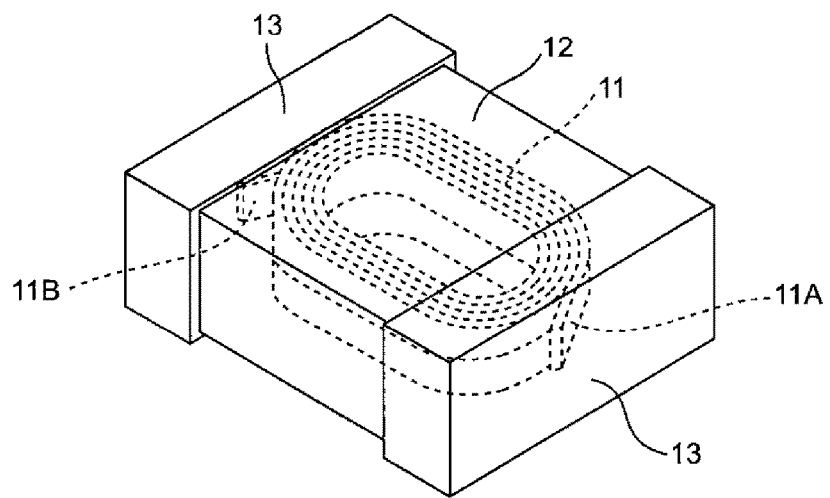
FIG. 2 is a perspective view schematically illustrating another example of a coil component of an embodiment of the present disclosure.

FIG. 2 is a perspective view schematically illustrating one example of a structure of a buried coil component. The coil component is structured such that: a coil conductor 11 is buried in a magnetic core 12 constituted by a substantially cuboid body obtained by molding a mixture of an Fe-based magnetic powder and a binding agent; and coil ends 11A and 11B of the coil conductor are electrically connected to terminal electrodes 13 at the respective opposite end portions of the magnetic core 12. The terminal electrodes 13 may be, for example, metal conductors in the shape of a cap and may be fitted to the respective opposite end portions of the magnetic core 12 and fixed to the magnetic core 12 and to the coil ends 11A and 11B with a conductive adhesive or the like.

EXAMPLES

Example 1

(Production of Coil Component)

About 20 g of an FeSiCr powder having a D50 of about 1 μm was added to about 37.2 g of ethanol. Tetraethyl orthosilicate was weighed so as to be about 1 wt % with respect to 100 wt % of the FeSiCr powder ($SiO_2$ equivalent) and was added to the ethanol containing the FeSiCr and stirred. Next, polyvinylpyrrolidone was weighed to be about 0.1 wt % with respect to 100 wt % of the FeSiCr powder and dissolved in about 3.2 g of pure water, and the solution was dropped into the ethanol containing the FeSiCr powder. The mixture was stirred for about 60 minutes, such that an FeSiCr powder having been insulated with a composite film of $SiO_2$ and polyvinylpyrrolidone was obtained. The insulated FeSiCr powder was measured for its volume resistivity at a pressure of about 4 kN with the use of a powder resistivity measurement system MCP-PD51 and Hiresta-UX available from Mitsubishi Chemical Analytech Co., Ltd. In this way, the insulated FeSiCr powder having a volume resistivity of about $5.2\times10^{10}$ Ω·cm was obtained. The insulated FeSiCr powder and an epoxy resin were mixed together and molded into a body measuring about 4 mm×4 mm×1 mm with the use of a mold at a pressure of about 4 t/cm². In the same manner as above, a toroidal ring having an inner diameter of about 4 mm, an outer diameter of about 9 mm, and a thickness of about 1 mm was formed with the use of a mold at a pressure of about 4 t/cm². The molded body was cured by heat at about 180° C. for about 30 minutes to give a dust core. In the same manner as above, the toroidal ring was also cured by heat at about 180° C. for about 30 minutes. The densities of the toroidal ring and the dust core were calculated from their weights and sizes, and it was found that the densities were the same. The magnetic permeability of the toroidal ring was measured at about 6.78 MHz with the use of an RF impedance analyzer (Agilent E4991A) and found to be about 5. The dust core was processed with a processing machine to have a core portion and thereafter was provided with terminal electrodes at its bottom by NiCr sputtering and NiCu sputtering. Next, a copper wire coated with an insulator was wound around the core portion and dipped in solder, such that a coil component having an inductance of about 200 nH was obtained.

(Checking Quality of Coil Component)

An amplitude current was applied to the obtained inductor until about 1 Arms was reached with the use of a network analyzer and an external power source at a frequency of about 6.77 MHz to 6.78 MHz with a DC current of about 0 mA, and Rac and Q factor were measured. The composition of the dust core and the results of the evaluations on the characteristics of the coil component are shown in Table 1.

Examples 2 to 4

As shown in Table 1, coil components were prepared in the same manner as in Example 1 and evaluated in the same manner as in Example 1, except that the FeSiCr powder was a powder which has a D50 of about 1.5 μm, 2 μm, or 5 μm, which is coated and insulated with a composite film containing $SiO_2$ and polyvinylpyrrolidone, and which has a volume resistivity of about $9.1\times10^{10}$ Ω·cm, $1.0\times10^{11}$ Ω·cm, or $5.0\times10^{10}$ Ω·cm and the obtained dust core had a magnetic permeability of about 6, 11, or 14. The results are shown in Table 1.

Examples 5 and 6

As shown in Table 1, coil components were prepared in the same manner as in Example 1 and evaluated in the same manner as in Example 1, except that, instead of the FeSiCr powder, a carbonyl iron powder which has a D50 of about 4 μm or 1.5 μm, which is coated and insulated with a composite film containing $SiO_2$ and polyvinylpyrrolidone, and which has a volume resistivity of about $2.0\times10^{10}$ Ω·cm or $4.6\times10^{10}$ Ω·cm was used and the obtained dust core had a magnetic permeability of about 15 or 8. The results are shown in Table 1.

Example 7

As shown in Table 1, a coil component was prepared in the same manner as in Example 1 and evaluated in the same manner as in Example 1, except that, instead of the FeSiCr powder, an FePCSiBNbCr powder which has a D50 of about 1.5 μm, which is coated and insulated with a composite film containing $SiO_2$ and polyvinylpyrrolidone, and which has a volume resistivity of about $3.5\times10^{10}$ Ω·cm was used and the obtained dust core had a magnetic permeability of about 5. The results are shown in Table 1.

Example 8

As shown in Table 1, a coil component was prepared in the same manner as in Example 1 and evaluated in the same manner as in Example 1, except that, instead of the FeSiCr powder, a carbonyl iron powder which has a D50 of about 4 μm, which is coated and insulated with a phosphate glass, and which has a volume resistivity of about $1.0\times10^{7}$ Ω·cm was used and the obtained dust core had a magnetic permeability of about 15. The results are shown in Table 1.

Comparative Example 1

As shown in Table 1, a coil component was prepared in the same manner as in Example 1 and evaluated in the same manner as in Example 1, except that the FeSiCr powder was a powder which has a D50 of about 10 µm, which is coated and insulated with a composite film containing $SiO_2$ and polyvinylpyrrolidone, and which has a volume resistivity of about $4.3 \times 10^{10}$ Ω·cm and the obtained dust core had a magnetic permeability of about 17. The results are shown in Table 1.

Comparative Example 2

As shown in Table 1, a coil component was prepared in the same manner as in Example 1 and evaluated in the same manner as in Example 1, except that, instead of the FeSiCr powder, a carbonyl iron powder which has a D50 of about 4 µm, which is not coated or insulated, and which has a volume resistivity of about $1.8 \times 10^0$ Ω·cm was used and the obtained dust core had a magnetic permeability of about 15. The results are shown in Table 1.

Comparative Example 3

As shown in Table 1, a coil component was prepared in the same manner as in Example 1 and evaluated in the same manner as in Example 1, except that, instead of the FeSiCr powder, an FeCo powder which has a D50 of about 0.02 µm, which is coated and insulated with $Al_2O_3$, and which has a volume resistivity of about $3.0 \times 10^7$ Ω·cm was used and the obtained dust core had a magnetic permeability of about 2. The results are shown in Table 1.

It should be noted that, in Table 1, the rate of increase in Rac and the rate of decrease in Q were calculated using the following equations.

Rate of increase in Rac (%)=(Rac at 1 Arms/Rac at 0.1 Arms)×100

Rate of decrease in Q factor (%)=(Q factor at 0.1 Arms/Q factor at 1 Arms)×100

Table 1 demonstrates the following. With the use of a magnetic core which is made from an Fe-based magnetic powder having a D50 of about 5 µm or smaller and having a volume resistivity of about $1.0 \times 10^7$ Ω·cm or more and which has a magnetic permeability of about 5 or more, it is possible to keep the Rac low while reducing the rate of decrease in Q factor even in the case where a current having an amplitude of as large as about 1 Arms is passed. Furthermore, with the use of an Fe-based magnetic powder having a D50 of about 1 µm or larger and 2 µm or smaller, it is possible to reduce the rate of increase in Rac when the current is increased from about 0.1 Arms to about 1 Arms. Furthermore, with the use of an Fe-based magnetic powder having a D50 of about 1 µm or larger and 1.5 µm or smaller, it is possible to reduce the rate of decrease in Q factor when the current is increased from about 0.1 Arms to about 1 Arms. Furthermore, with the use of an alloy containing Fe, Si, and Cr, such as FeSiCr alloy or FePCSiBNbCr alloy, it is possible to reduce initial Rac.

A coil component of the present disclosure is able to keep the Rac low even when a large amplitude current is passed. Therefore, the coil component is useful as a coil component for use in, for example, a magnetic resonance circuit for wireless power transmission.

While some embodiments of the disclosure have been described above, it is to be understood that variations and modifications will be apparent to those skilled in the art without departing from the scope and spirit of the disclosure. The scope of the disclosure, therefore, is to be determined solely by the following claims.

TABLE 1

| No. | D50 (µm) | composition | insulator film | volume resistivity (Ω·cm) | density (g/cc) | magnetic permeability | Rac@0.1 Arms (Ω) | Rac@1 Arms (Ω) | rate of increase in Rac (%) | Q@0.1 Arms | Q@1 Arms | rate of decrease in Q (%) |
|---|---|---|---|---|---|---|---|---|---|---|---|---|
| Example 1 | 1 | FeSiCr | $SiO_2$ polyvinylpyrrolidone | $5.2 \times 10^{10}$ | 4.3 | 5 | 0.11 | 0.12 | 109 | 49 | 40 | 18 |
| Example 2 | 1.5 | FeSiCr | $SiO_2$ polyvinylpyrrolidone | $9.1 \times 10^{10}$ | 4.5 | 6 | 0.11 | 0.13 | 118 | 47 | 38 | 19 |
| Example 3 | 2 | FeSiCr | $SiO_2$ polyvinylpyrrolidone | $1.0 \times 10^{11}$ | 5.3 | 11 | 0.13 | 0.16 | 123 | 45 | 35 | 22 |
| Example 4 | 5 | FeSiCr | $SiO_2$ polyvinylpyrrolidone | $5.0 \times 10^{10}$ | 5.5 | 14 | 0.13 | 0.20 | 154 | 45 | 32 | 29 |
| Example 5 | 4 | carbonyl iron | $SiO_2$ polyvinylpyrrolidone | $2.0 \times 10^{10}$ | 5.9 | 15 | 0.16 | 0.21 | 131 | 37 | 27 | 27 |
| Example 6 | 1.5 | carbonyl iron | $SiO_2$ polyvinylpyrrolidone | $4.6 \times 10^{10}$ | 4.7 | 8 | 0.15 | 0.16 | 107 | 47 | 38 | 19 |
| Example 7 | 1.5 | FePCSiBNbCr | $SiO_2$ polyvinylpyrrolidone | $3.5 \times 10^{11}$ | 4.3 | 5 | 0.12 | 0.14 | 117 | 47 | 38 | 19 |
| Example 8 | 4 | carbonyl iron | phosphate glass | $1.0 \times 10^7$ | 4.7 | 15 | 0.16 | 0.26 | 163 | 37 | 27 | 27 |
| Comparative Example 1 | 10 | FeSiCr | $SiO_2$ polyvinylpyrrolidone | $4.3 \times 10^{10}$ | 5.6 | 17 | 0.19 | 0.30 | 158 | 35 | 22 | 37 |
| Comparative Example 2 | 4 | carbonyl iron | none | $1.8 \times 10^0$ | 4.7 | 15 | 0.16 | 0.30 | 188 | 35 | 27 | 23 |
| Comparative Example 3 | 0.02 | FeCo | $Al_2O_3$ | $3.0 \times 10^7$ | 3.5 | 2 | 0.30 | 0.31 | 103 | 29 | 25 | 14 |

What is claimed is:

1. A coil component comprising:
   a magnetic core that contains an Fe-based magnetic powder and a binding agent and that has a magnetic permeability of 5 or more, the Fe-based magnetic powder having a volume resistivity of $1.0 \times 10^7$ Ω·cm or more;
   an insulator film that contains an inorganic oxide and a water-soluble polymer; and
   a coil conductor, wherein
   the Fe-based magnetic powder has an average particle size, defined as D50, of 5 μm or smaller.

2. The coil component according to claim 1, wherein the D50 of the Fe-based magnetic powder is 2 μm or smaller.

3. The coil component according to claim 1, wherein the volume resistivity of the Fe-based magnetic powder is $1.0 \times 10^{10}$ Ω·cm or more.

4. The coil component according to claim 1, further comprising:
   a terminal electrode that is disposed on the magnetic core and that is in electrical communication with the coil conductor, wherein
   the binding agent contains a cyclic siloxane or a branched siloxane, and
   the terminal electrode contains one selected from the group consisting of Sc, Ti, V, Cr, Mn, Y, Zr, Nb, Mo, Tc, Hf, Ta, W, and Re.

5. The coil component according to claim 1, wherein the insulator film contains phosphate glass.

6. The coil component according to claim 1, wherein a covering resin is provided on the magnetic core to seal the coil conductor.

7. The coil component according to claim 1, wherein the insulator film surrounds particles of the Fe-based magnetic powder.

8. The coil component according to claim 1, wherein the water-soluble polymer is at least one selected from the group consisting of polyvinylpyrrolidone, polyethyleneimine, carboxymethylcellulose, gelatin, polyacrylic acid, polyethylene glycol, and polyvinyl alcohol.

* * * * *